(12) United States Patent
Rowley

(10) Patent No.: US 8,145,616 B2
(45) Date of Patent: Mar. 27, 2012

(54) VIRTUAL ATTRIBUTE CONFIGURATION SOURCE VIRTUAL ATTRIBUTE

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 280 days.

(21) Appl. No.: 11/656,579

(22) Filed: Jan. 22, 2007

(65) Prior Publication Data

US 2008/0177705 A1 Jul. 24, 2008

(51) Int. Cl.
  *G06F 7/00* (2006.01)
  *G06F 17/30* (2006.01)
  *G06F 15/16* (2006.01)
  *G06F 12/00* (2006.01)

(52) U.S. Cl. .................. 707/706; 707/769; 707/899

(58) Field of Classification Search ............ 707/3
  See application file for complete search history.

(56) References Cited

U.S. PATENT DOCUMENTS

| | | | |
|---|---|---|---|
| 5,799,141 A | 8/1998 | Galipeau et al. | |
| 6,192,362 B1 | 2/2001 | Schneck et al. | |
| 6,339,827 B1 | 1/2002 | Stokes et al. | |
| 6,347,312 B1 | 2/2002 | Byrne et al. | |
| 6,418,441 B1 * | 7/2002 | Call | 707/10 |
| 6,470,354 B1 | 10/2002 | Aldridge et al. | |
| 6,640,230 B1 * | 10/2003 | Doss et al. | 1/1 |
| 6,651,070 B1 * | 11/2003 | Hirashima et al. | 707/102 |
| 6,715,128 B1 | 3/2004 | Hirashima et al. | |
| 6,947,953 B2 * | 9/2005 | Herzenberg et al. | 707/104.1 |
| 6,970,873 B2 | 11/2005 | Fu et al. | |
| 7,043,472 B2 * | 5/2006 | Aridor et al. | 1/1 |
| 7,209,970 B1 | 4/2007 | Everson et al. | |
| 7,444,594 B2 * | 10/2008 | Abbott et al. | 715/744 |
| 7,620,630 B2 * | 11/2009 | Lloyd et al. | 1/1 |
| 7,840,588 B2 * | 11/2010 | Bell et al. | 707/769 |
| 7,873,614 B2 * | 1/2011 | Boreham et al. | 707/705 |
| 7,941,419 B2 * | 5/2011 | Bhatkar et al. | 707/708 |
| 2002/0035569 A1 * | 3/2002 | Clark et al. | 707/102 |
| 2003/0037044 A1 | 2/2003 | Boreham et al. | |
| 2003/0055917 A1 | 3/2003 | Boreham et al. | |
| 2003/0061347 A1 | 3/2003 | Boreham et al. | |
| 2003/0078937 A1 | 4/2003 | Boreham et al. | |
| 2003/0078995 A1 | 4/2003 | Boreham et al. | |
| 2003/0084069 A1 | 5/2003 | Boreham et al. | |
| 2003/0088656 A1 | 5/2003 | Wahl et al. | |
| 2003/0088678 A1 | 5/2003 | Boreham et al. | |
| 2003/0105733 A1 | 6/2003 | Boreham et al. | |
| 2003/0105742 A1 | 6/2003 | Boreham et al. | |
| 2003/0115196 A1 | 6/2003 | Boreham et al. | |
| 2003/0135491 A1 | 7/2003 | Rowley | |
| 2003/0191751 A1 * | 10/2003 | Vora et al. | 707/3 |

(Continued)

OTHER PUBLICATIONS

Randy Urbane, Oracle® Database Advanced Replication, Dec. 2003, 10g Release 1 (10.1), Oracle Corporation (342 pgs.).

(Continued)

*Primary Examiner* — Mohammad Ali
*Assistant Examiner* — Griselle Corbo
(74) *Attorney, Agent, or Firm* — Lowenstein Sandler PC

(57) ABSTRACT

Virtual attribute logic adds virtual attributes to a Lightweight Directory Access Protocol ("LDAP") response, and meta-virtual attribute logic adds additional virtual attributes to provide further information about the virtual attributes. For example, a Distinguished Name ("DN") of an entry that provided a virtual attribute may be added by the meta-virtual attribute logic.

20 Claims, 5 Drawing Sheets

U.S. PATENT DOCUMENTS

| | | | |
|---|---|---|---|
| 2004/0006557 A1* | 1/2004 | Baker et al. | 707/3 |
| 2004/0049518 A1* | 3/2004 | Billieux et al. | 707/102 |
| 2004/0267670 A1 | 12/2004 | Minyailov | |
| 2005/0021498 A1* | 1/2005 | Boreham et al. | 707/1 |
| 2005/0060646 A1* | 3/2005 | Gauthier et al. | 715/513 |
| 2005/0080792 A1 | 4/2005 | Ghatare | |
| 2005/0160090 A1 | 7/2005 | Harjanto | |
| 2005/0171958 A9* | 8/2005 | Cheng et al. | 707/100 |
| 2005/0203897 A1 | 9/2005 | Kapitskaia et al. | |
| 2005/0216485 A1* | 9/2005 | Bell et al. | 707/100 |
| 2005/0228794 A1* | 10/2005 | Navas et al. | 707/10 |
| 2006/0122963 A1 | 6/2006 | Klein et al. | |
| 2006/0179036 A1* | 8/2006 | Broker | 707/3 |
| 2007/0016575 A1* | 1/2007 | Hurst-Hiller et al. | 707/5 |
| 2007/0149190 A1* | 6/2007 | Matsuhashi | 455/432.1 |
| 2007/0240050 A1* | 10/2007 | Quinn-Jacobs | 715/700 |
| 2008/0114770 A1* | 5/2008 | Chen et al. | 707/10 |

OTHER PUBLICATIONS

Red Hat Office Action for U.S. Appl. No. 11/703,310 mailed Aug. 18, 2010, 14 pgs.

Red Hat Office Action for U.S. Appl. No. 11/607,559 mailed Nov. 19, 2010, 22 pgs.

Red Hat Office Action for U.S. Appl. No. 11/706,011 mailed Dec. 22, 2010, 12 pgs.

Wahl, M., "A summary of the X.500(96) User Schema for use with LDAPv3", Wahl, M., *Netowrk Working Group, A summary of the X.500(96) User Schema for use with LDAPv3*, Critical Angle Inc., Dec. 1997, 15 pages.

Zeilenga, K., "Lightweight Directory Access Protocol (LDAP): Technical Spericiation Road Map", Zeilenga, K., *Network Working Group, Lightweight Directory Access Protocol (LDAP): Technical Spericiation Road Map*, OpenLDAP Foundation, Jun. 2006, 8 pages.

Red Hat Office Action for U.S. Appl. No. 11/703,310 mailed Dec. 18, 2008.

Red Hat Office Action for U.S. Appl. No. 11/703,310 mailed Mar. 2, 2010.

Red Hat Office Action for U.S. Appl. No. 11/703,310 mailed Oct. 28, 2009.

Red Hat Office Action for U.S. Appl. No. 11/607,559 mailed Nov. 12, 2008.

Red Hat Office Action for U.S. Appl. No. 11/607,559 mailed Apr. 30, 2009.

Red Hat Office Action for U.S. Appl. No. 11/607,559 mailed Oct. 5, 2009.

Red Hat Office Action for U.S. Appl. No. 11/607,559 mailed Mar. 16, 2010.

Red Hat Office Action for U.S. Appl. No. 11/607,559 mailed Jun. 18, 2010.

Red Hat Office Action for U.S. Appl. No. 11/706,011 mailed May 12, 2009.

Red Hat Office Action for U.S. Appl. No. 11/706,011 mailed Sep. 1, 2009.

Red Hat Office Action for U.S. Appl. No. 11/706,011 mailed Jan. 22, 2010.

Red Hat Office Action for U.S. Appl. No. 11/706,011 mailed May 26, 2010.

Red Hat Notice of Allowance for U.S. Appl. No. 11/607,559 mailed Jun. 17, 2011.

Red Hat Office Action for U.S. Appl. No. 11/706,011 mailed May 23, 2011.

Red Hat Notice of Allowance for U.S. Appl. No. 11/706,011 mailed Sep. 1, 2011.

Red Hat Advisory Action for U.S. Appl. No. 11/607,559 mailed Jul. 21, 2009.

Red Hat Advisory Action for U.S. Appl. No. 11/607,559 mailed May 17, 2010.

Red Hat Advisory Action for U.S. Appl. No. 11/703,310 mailed Jan. 20, 2010.

Red Hat Advisory Action for U.S. Appl. No. 11/706,011 mailed Nov. 3, 2009.

Red Hat Advisory Action for U.S. Appl. No. 11/706,011 mailed Jul. 27, 2010.

Red Hat Advisory Action for U.S. Appl. No. 11/706,011 mailed Aug. 15, 2011.

* cited by examiner

130

DN : op=QueryAny, dc=example, dc=com
op : QueryAny
c : US — 135

110

DN : cn=Bob, ou=Engineering,
dc=example, dc=com
cn : Bob — 113
sn : Baker
uid : 404
116

125

DN : op=QueryAny, ou=Engineering,
dc=example, dc=com
op : QueryAny
postalAddress : 31415 Logarithm Way
Sunnyvale, California
120

140

DN : cn=Bob, ou=Engineering,
dc=example, dc=com
141 — cn : Bob
sn : Baker
143 — uid : 404
postalAddress : 31415 Logarithm Way
Sunnyvale, California
c : US — 145
147 — weather : Clear, 72 degrees
149
virtualAttributes : op=QueryAny,dc=example,dc=com;
op=QueryAny,ou=Engineering,dc=example,dc=com;
op=QueryAny,va=Dynamic,dc=example,dc=com

*FIG. 1*

VIRTUAL ATTRIBUTE CONFIGURATION SOURCE VIRTUAL ATTRIBUTE

FIELD

The invention relates to hierarchical database operations. In particular, the invention provides mechanisms to extend the capabilities of a Lightweight Directory Access Protocol ("LDAP") database.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity and contact information for people and organizations.

LDAP presents a hierarchical view of the data in a database. Records are presented as a tree of entries like that shown in FIG. 2, element 200. An entry 210, detailed in FIG. 2A, is identified by a Distinguished Name ("DN") 211, which is made up of a Relative Distinguished Name ("RDN") 212—an unordered set of one or more Attribute Value Assertions ("AVAs")—and the DN 213 of the entry's parent. The AVAs correspond to one or more of the attributes 214 in the entry (the "distinguished attributes"). Attributes (both distinguished 214 and ordinary 215) consist of an attribute description 216 (an attribute type with zero or more options), plus one or more values 217.

An LDAP server responds to commands from an LDAP client. For example, a client may create a new entry, delete an entry, rename an entry, modify an entry, or (most commonly) retrieve the attributes in an entry. In a basic LDAP implementation, identical data elements in two LDAP entries are completely independent copies of each other. Thus, for example, even if two employees work at the same facility of an organization, the "postalAddress" attributes of their records are independent, so if the facility is moved to a different location, each employee's LDAP record must be updated independently to show the new address.

Virtual LDAP attributes have been developed to reduce the effort required to make changes to groups of data records, and to prevent errors that may occur when the same change is to be made to many records. Thus, for example, an LDAP server might store an entry 220 in the hierarchical tree (or elsewhere), the entry containing information similar to that detailed in FIG. 2B. Attribute 225 is a virtual attribute to be added to an LDAP response prepared for any client that retrieves an employee's entry. Such a response is detailed in FIG. 2C: an LDAP query for the record identified by DN:cn=Alice, dc=example, dc=com might retrieve attributes 230 that are actually present in the requested entry 210, along with a virtual postalAddress attribute 240 copied from record 220 at DN:operation=QueryEmployee, dc=example, dc=com. A client receiving the query response would see the postalAddress attribute 240 as part of Alice's LDAP record. In some virtual attribute implementations, it is not possible for the client to distinguish between ordinary and virtual attributes provided with an LDAP response. Note that virtual attribute source data need not be stored in the same hierarchy as other LDAP data, nor even in the same database. However, common storage may permit the use of existing LDAP administrative tools to monitor and maintain the database.

Virtual attributes are simple and effective, and can be deployed without requiring changes to LDAP clients (which can receive and process the virtual attributes identically to ordinary attributes). However, virtual attributes can complicate administration and troubleshooting of an LDAP database. Further refinements to virtual LDAP attributes may improve this situation.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 1 shows several Lightweight Directory Access Protocol ("LDAP") directory entries and an LDAP search response prepared according to an embodiment of the invention.

FIGS. 2A and 2B show details of LDAP directory entries.

FIG. 2C shows the contents of an LDAP search response.

DETAILED DESCRIPTION

Figure 2:
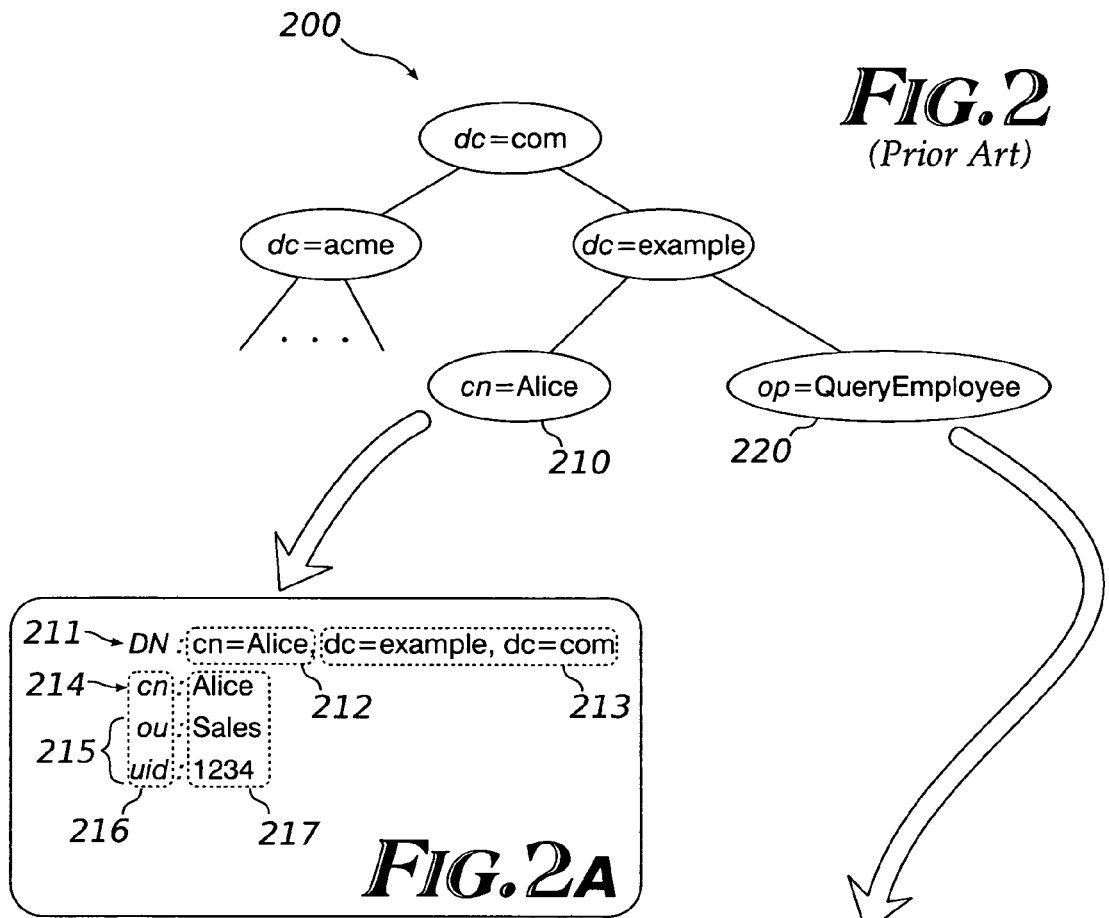
FIG. 2 shows a portion of an LDAP directory hierarchy.

Embodiments of the invention operate on the server side of a Lightweight Directory Access Protocol ("LDAP") server-client system and build compatibly on standard LDAP functionality to provide improved manageability for service extensions that can be accessed by legacy and naïve clients.

FIG. 1 shows three entries in an LDAP database hierarchy or "tree." The entries 110, 120 and 130 are arranged to suggest their positions in the hierarchy (entries 110 and 120 are siblings at the same level in the tree, while entry 130 is superior to entries 120 and 130). The tree would contain other nodes that are not shown in this figure.

Entry 110 is describes an employee in the Engineering department of the Example corporation. The entry contains a distinguished attribute 113 and two ordinary attributes 116. An LDAP client querying an LDAP server to retrieve attributes associated with Distinguished Name ("DN") "cn=Bob, ou=Engineering, dc=example, dc=com" would expect to receive attributes 113 and 116. An LDAP server implementing virtual attributes might add attribute 125 from sibling entry 120 and attribute 135 from superior entry 130 to the response.

Element 140 shows an LDAP response created according to an embodiment of the present invention. The response contains "real" attributes 141 that are actually present in entry 110 (attributes 113 and 116). It also contains virtual attributes 143 and 145, taken from other entries in the directory hierarchy. Virtual attribute 147 shows how an LDAP response can contain real-time information from a source outside the database (here, the attribute value indicates the present weather conditions at the employee's work location).

Element 149 is the final virtual attribute supplied with LDAP response 140. It is a multi-valued attribute, and its values provide information about the other virtual attributes.

In this respect, it is a "meta" virtual attribute. Two of the values shown in this example are the DNs of the database entries associated with virtual attributes 143 and 145. A third value is the DN of a database entry (not shown) that caused the "weather" virtual attribute 147 to be added. The entry at DN op=QueryAny, va=Dynamic, dc=example, dc=com might contain a Uniform Resource Locator ("URL") of a web service that provided the weather condition attribute value 147. Element 149 can be thought of as a virtual attribute source attribute ("VASA"). The attribute is itself virtual (it is not part of the requested record, but instead is added automatically by the LDAP server). Legacy and naïve clients that merely require information about the employee identified by the DN may ignore the "VirtualAttributes" values, but an LDAP database administrator or administrative program can refer to the values to learn how response 140 came to include virtual attributes 143, 145 and 147.

Virtual attribute source attribute 149 contains only very simple information, better suited to illustrating the general idea of an embodiment of the invention than to practical implementation. An actual embodiment may include far more, and more detailed, information in a virtual attribute source attribute. For example, an embodiment may establish a hierarchy of virtual attribute priority (a different hierarchy from the LDAP database entries hierarchy). Virtual attributes could then be used to provide fallback or default values for attributes that did not exist in the requested record, or in some higher-priority virtual attribute. As a basic example of this hierarchy of priority, consider a set of virtual attributes to ensure that query responses contain a phone number. A low-priority virtual attribute might provide a general information phone number for the entire organization, while higher-priority virtual attributes would provide numbers to reach various department secretaries. If an employee's entry lacked a phone number, a query for the entry would provide the department secretary's number (which would override the virtual attribute containing the general information phone number). If the employee's entry was also not associated with a department, the response would provide the general information phone number. A virtual attribute source attribute could identify not only the entry that provided the phone number, but also any lower-priority entries that were overridden by that entry. As an alternative to a priority-ranking system, the LDAP database hierarchy itself could be used to encode an implicit ranking of a set of default virtual attributes, so that a virtual attribute located closer to a target record in the hierarchy would override a virtual attribute located farther away. Instead of having virtual attributes override one another, some embodiments may collect virtual attribute values and supply some or all of them as a concatenated or multi-valued attribute in the response.

An LDAP response may contain several VASAs. For example, each virtual attribute in the response may have a corresponding VASA, explaining where the virtual attribute's value came from, why it was added to the response, what other values were overridden, and/or how long the value is to be considered useful.

Figure 3:
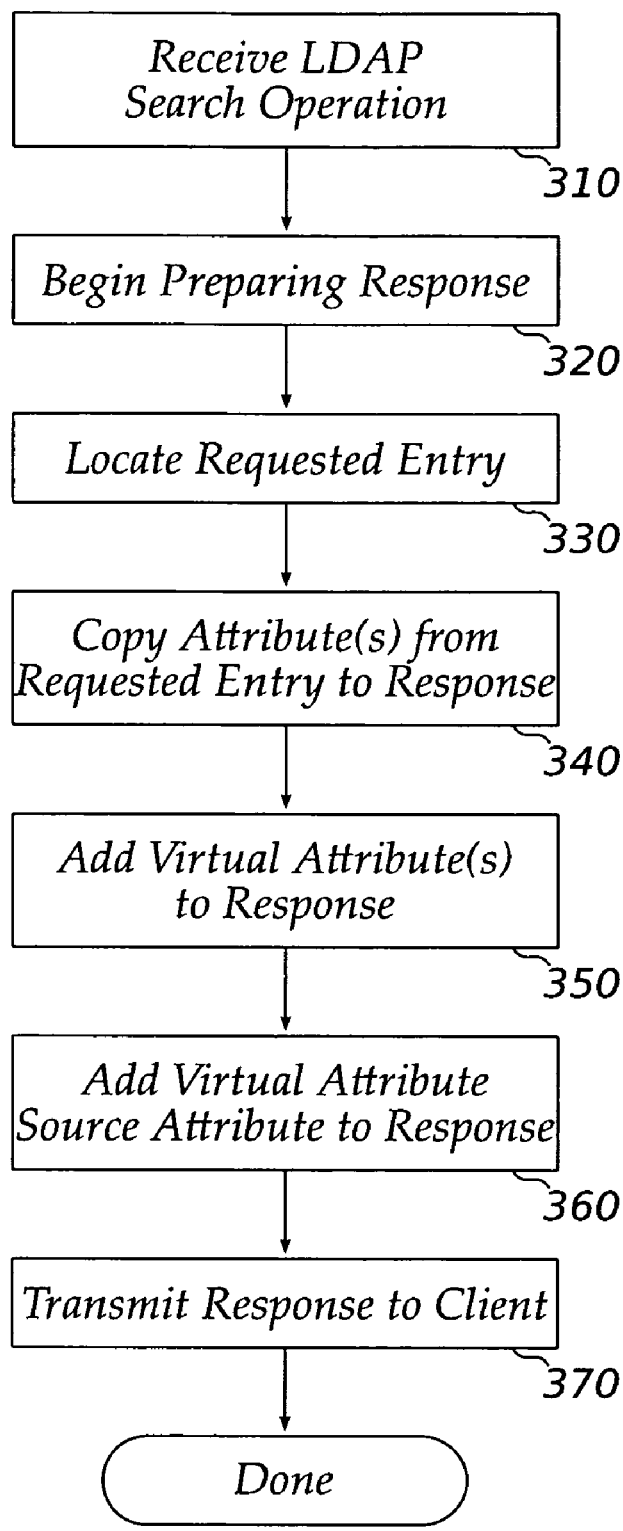
FIG. 3 outlines a method to prepare an LDAP response including a virtual attribute source attribute.

FIG. 3 outlines a procedure used by an embodiment of the invention to prepare an LDAP response with a virtual attribute source attribute. Operations begin when an LDAP server receives an LDAP search operation from a client (310). The server begins preparing the response (320), for example by allocating memory and other resources, preparing an underlying database for operations, and so on. The entry requested by the search operation is located (330) and attributes in the entry are copied to the response being prepared (340). One or more virtual attributes are added to the response (350).

An LDAP server may add certain virtual attributes to every response, or may search at predetermined locations in the database to find virtual attributes to be added to a subset of responses. Virtual attributes may be found, for example, at Distinguished Names ("DNs") superior or inferior (above or below) the requested record in the hierarchy, at the same level in the hierarchy, or within another predetermined subtree of the hierarchy, not directly related to the requested record. Some virtual attributes may be constructed using values retrieved from sources outside the database. For example, an LDAP server could obtain real-time Global Positioning System ("GPS") data about a subject of the requested LDAP record, and include that data as a value of a virtual attribute in the response. Virtual attributes may contain values derived from a chain or aggregation of sources. For example, a virtual attribute may contain a "responsiveness" measure that indicates how quickly the subject of the requested LDAP record is likely to respond to an electronic mail message, based on the current number of pending messages in his mailbox, the age of the messages, and the day of the week. As these examples suggest, virtual attributes are extremely flexible, and can be used for purposes ranging from factoring identical attributes out of individual LDAP entries and storing them in one or more virtual-attribute source entries; to obtaining and/or computing dynamic data related to the subject of a search operation.

When the one or more virtual attributes have been added to the response, an embodiment adds one or more virtual attribute source attributes to the response (360). As described above, the value(s) of these attribute(s) may be as simple as the DNs of entries that contributed a virtual attribute, or as complex as complete explanations in machine-processable and/or human-readable forms (and potentially in multiple languages) that describe how and why virtual attributes were added. Virtual attribute source attributes may be of no interest to ordinary LDAP clients, but may be valuable to an administrator or maintenance program investigating the configuration or operation of the LDAP server.

Finally, the prepared LDAP response, containing one or more ordinary attributes, one or more virtual attributes, and one or more virtual attribute source attributes, is transmitted to the client (370). Note that some embodiments may, under some circumstances, transmit the virtual attribute source attribute(s) only, so the portions of the foregoing process relating to obtaining and/or computing virtual attributes may be performed simply to learn what virtual attributes would be added to a response, and where the values came from. Some LDAP clients (e.g. administrative tools) may be interested in the sources of any virtual attributes, rather than the virtual attributes' values.

Figure 4:
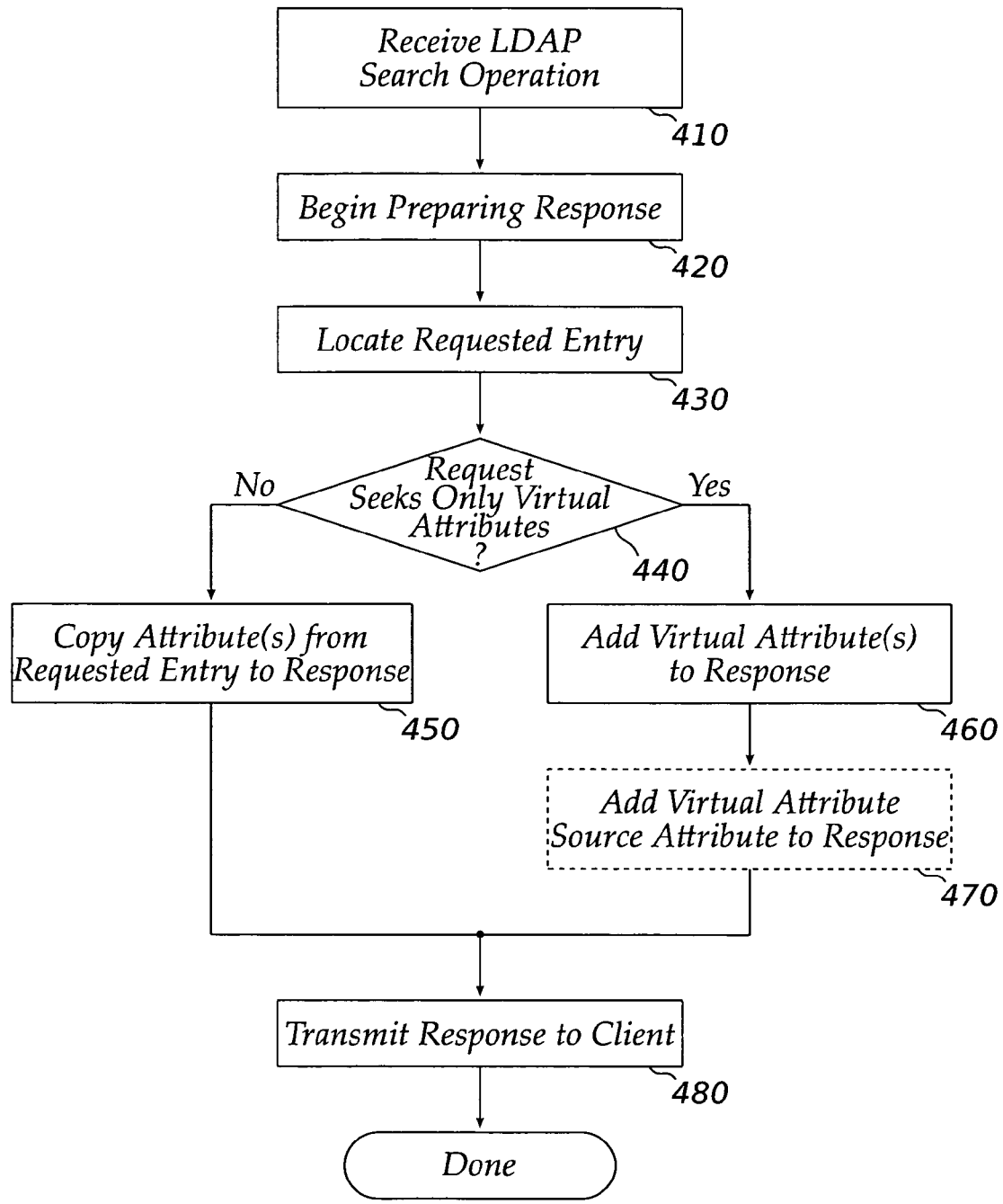
FIG. 4 outlines a method that is useful for administering a system that places virtual attribute source attributes into some LDAP responses.

FIG. 4 outlines a procedure implemented by some embodiments of the invention. An LDAP search operation is received from an LDAP client (410). The search operation includes an LDAP control with a unique identifier to indicate whether only ordinary attributes, or only virtual attributes, are desired. (The LDAP control can be thought of as a kind of flag, indicating the type of data the client seeks.) The LDAP server begins preparing a response (420) and locates the requested entry (430).

Now, if the request seeks only ordinary ("real" or non-virtual) attributes (440), attributes from the requested entry are copied to the response (450). On the other hand, if the request seeks only virtual attributes (440), virtual attribute values are found or computed as described above and added to the response (460). A virtual attribute source attribute, also as described above, may be added too (470). Some embodiments may recognize three or more different identifiers or flags, requesting retrieval of only real attributes, only virtual attributes, only virtual attribute source attributes, or specific combinations of real and virtual attributes. Finally, the prepared LDAP response is transmitted to the client (480). This procedure permits an administrator or maintenance program to easily retrieve just the ordinary attributes, just the virtual attributes or just the attributes describing the sources of the virtual attributes, associated with a DN.

Figure 5:
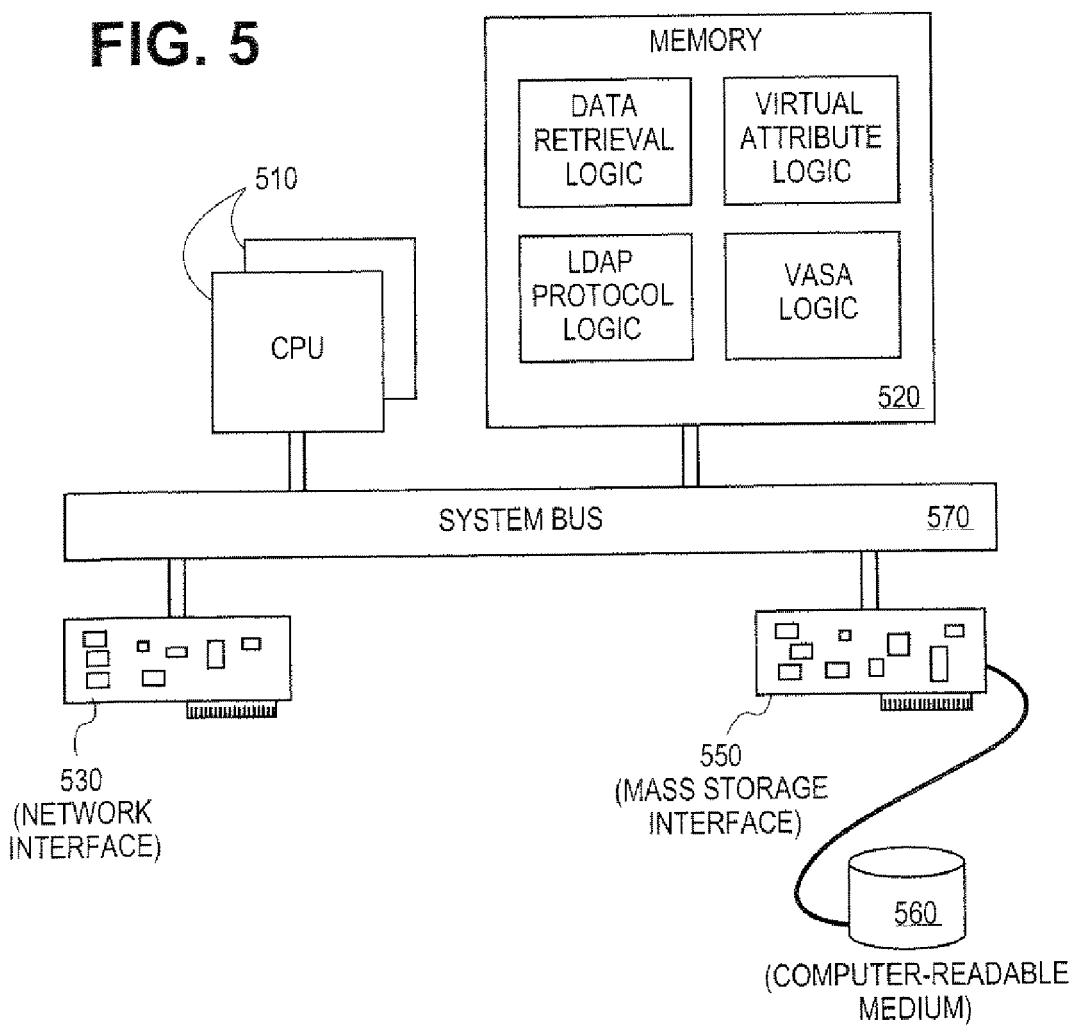
FIG. 5 shows a some components of a computer system that can implement an embodiment of the invention.

FIG. 5 shows some components and subsystems of a computer system that can implement some of the methods of embodiments of the invention. One or more programmable processors ("central processing units" or "CPUs") 510 execute instructions contained in memory 520 to perform methods according to an embodiment. Instructions may be separated into modules, subroutines or libraries to perform various related functions. For example, there may be an LDAP protocol logic module, a data retrieval module, a virtual attribute logic module and/or a virtual attribute source attribute ("VASA") logic module. Memory 520 may also contain data upon which the instructions operate. For example, LDAP requests, responses, entries and attributes located in the database, virtual attributes and virtual attribute source attributes, may be held in memory 520 at various times. A network interface 530 permits the system to communicate with its peers and to exchange data as described above. A mass storage interface 550 permits the system to store and retrieve information on a computer-readable medium 560. System bus 570 connects these components and carries control signals and data between them.

An embodiment of the invention may be a machine-readable medium having stored thereon instructions and data to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory device, etc.), a machine readable transmission medium (electrical, optical, acoustical or other form of non-propagated signals), etc.

The applications of the present invention have been described largely by reference to specific examples and in terms of particular allocations of functionality to certain hardware and/or software components. However, those of skill in the art will recognize that virtual attribute source attributes for LDAP virtual attributes can also be implemented by software and hardware that distribute the functions of embodiments of this invention differently than herein described. Such variations and implementations are understood to be captured according to the following claims.

I claim:

1. A method comprising:
   preparing, by a Lightweight Directory Access Protocol (LDAP) directory server that performs search operations on an LDAP database, a response to a LDAP search operation on the LDAP database, the response preparation to include identifying at least one virtual attribute in the response;
   establishing, by the LDAP directory server, a hierarchy of priority of potential sources that can contribute the at least one virtual attribute, the hierarchy of priority comprising a ranking of the potential sources when compared to one another that results in a listing of the potential sources in their priority order;
   selecting, by the LDAP directory server, a highest ranking source in the hierarchy of priority that returns a data value, the selected source to contribute the at least one virtual attribute;
   identifying, by the LDAP directory server, information about the at least one virtual attribute, wherein the information comprises a distinguished name (DN) of the selected source that contributed the at least one virtual attribute and a listing of lower-priority entries in the hierarchy of priority that were overridden by the selection of the highest ranking source that returned a data value;
   placing, by the LDAP directory server, a virtual attribute source attribute (VASA) into the response as a separate attribute in the response from the at least one virtual attribute, the VASA including the identified information about the at least one virtual attribute; and
   transmitting, by the LDAP directory server, the response to a client.

2. The method of claim 1, further comprising:
   locating a first record in a database corresponding to a Distinguished Name (DN) in the LDAP search operation;
   placing data from the first record into the response;
   locating a second record in the database; and
   placing data from the second record into the response as the at least one virtual attribute.

3. The method of claim 2 wherein a value of the VASA includes a DN of the second record.

4. The method of claim 2 wherein the hierarchy of priority of the VASA indicates whether the at least one virtual attribute overrode a lower-priority virtual attribute source.

5. The method of claim 2 wherein the second record is a superior or inferior of the first record.

6. The method of claim 2 wherein the second record is not hierarchically related to the first record.

7. The method of claim 1 wherein the at least one virtual attribute indicates a real-time quantity.

8. The method of claim 7 wherein the VASA indicates a time period associated with the real-time quantity.

9. A method comprising:
   receiving a Lightweight Directory Access Protocol (LDAP) search for an LDAP record at a LDAP server that performs the LDAP search on an LDAP database, the search to include a flag to indicate whether a client wishes to receive only real attributes, only virtual attributes, or only a virtual attribute source attribute (VASA);
   preparing, by the LDAP server, an LDAP response containing only real attributes if the flag matches a first predetermined value;
   preparing, by the LDAP server, an LDAP response containing only virtual attributes if the flag matches a second predetermined value;
   preparing, by the LDAP server, an LDAP response containing only the VASA if the flag matches a third predetermined value, wherein preparing the LDAP response containing only the VASA further comprises:
      establishing a hierarchy of priority of potential sources that can contribute a virtual attribute associated with the VASA, the hierarchy of priority comprising a ranking of the potential sources of the virtual attribute when compared to one another that results in a listing of the potential sources in their priority order;
      selecting a highest ranking source in the hierarchy of priority that returns a data value, the selected source to contribute the virtual attribute;
      identifying information about the virtual attribute, wherein the information comprises a distinguished name (DN) of the selected source that contributed the virtual attribute and a listing of lower-priority entries in the hierarchy of priority that were overridden by the selection of the highest ranking source that returned a data value; and
      placing the VASA into the response, the VASA including the identified information about the at least one virtual attribute; and
   transmitting, by the LDAP server, the prepared LDAP response to a client.

10. The method of claim 9, further comprising:
    placing the VASA into the LDAP response to identify the source of the virtual attribute if the flag matches the second predetermined value.

11. A non-transitory machine-readable storage medium containing instructions and data to cause a programmable processor to perform operations comprising:
    preparing, by a Lightweight Directory Access Protocol (LDAP) directory server that performs search operations on an LDAP database, a response to a LDAP search operation on the LDAP database, the response preparation to include identifying at least one virtual attribute in the response;
    establishing, by the LDAP directory server, a hierarchy of priority of potential sources that can contribute the at least one virtual attribute, the hierarchy of priority comprising a ranking of the potential sources when compared to one another that results in a listing of the potential sources in their priority order;
    selecting, by the LDAP directory server, a highest ranking source in the hierarchy of priority that returns a data value, the selected source to contribute the at least one virtual attribute;
    identifying, by the LDAP directory server, information about the at least one virtual attribute, wherein the information comprises a distinguished name (DN) of the selected source that contributed the at least one virtual attribute and a listing of lower-priority entries in the hierarchy of priority that were overridden by the selection of the highest ranking source that returned a data value;
    placing, by the LDAP directory server, a virtual attribute source attribute (VASA) into the response as a separate attribute in the response from the at least one virtual attribute, the VASA including the identified information about the at least one virtual attribute; and
    transmitting, by the LDAP directory server, the response to a client.

12. The non-transitory machine-readable storage medium of claim 11, wherein the instructions and data cause the programmable processor to perform further operations comprising:
   locating a first record in a database corresponding to a Distinguished Name (DN) in the LDAP search operation;
   placing data from the first record into the response;
   locating a second record in the database; and
   placing data from the second record into the response as the at least one virtual attribute.

13. The non-transitory machine-readable storage medium of claim 12 wherein a value of the VASA includes a DN of the second record.

14. The non-transitory machine-readable storage medium of claim 12 wherein the second record is a superior or inferior of the first record.

15. The non-transitory machine-readable storage medium of claim 12 wherein the second record is not hierarchically related to the first record.

16. The non-transitory machine-readable storage medium of claim 11 wherein the at least one virtual attribute indicates a real-time quantity.

17. The non-transitory machine-readable storage medium of claim 16 wherein the VASA indicates a time period associated with the real-time quantity.

18. A system comprising:
   a mass storage device to store a Lightweight Directory Access Protocol (LDAP) database;
   a communication interface communicably coupled to the LDAP database to receive a database query request; and
   a memory communicably coupled to the mass storage device and the communication interface, the memory configured to store:
      retrieval logic to retrieve data from the LDAP database corresponding to the database query request;
      virtual attribute logic to add a first virtual attribute to a response corresponding to the database query request;
      virtual attribute source virtual attribute logic to add a virtual attribute source attribute (VASA) to the response, wherein adding the VASA to the response further comprises the virtual attribute source virtual attribute logic configured to:
         establish a hierarchy of priority of potential sources that can contribute a virtual attribute associated with the VASA, the hierarchy of priority comprising a ranking of the potential sources of the virtual attribute when compared to one another that results in a listing of the potential sources in their priority order;
         select a highest ranking source in the hierarchy of priority that returns a data value, the selected source to contribute the virtual attribute;
         identify information about the virtual attribute, wherein the information comprises a distinguished name (DN) of the selected source that contributed the virtual attribute and a listing of lower-priority entries in the hierarchy of priority that were overridden by the selection of the highest ranking source that returned a data value; and
         place the VASA into the response, the VASA including the identified information about the at least one virtual attribute; and
      protocol logic to transmit the response to a client.

19. The system of claim 18 wherein the database query request is a LDAP search operation.

20. The system of claim 18, further comprising:
   database logic to maintain a database for the retrieval logic.

* * * * *